(12) United States Patent
Kunkel et al.

(10) Patent No.: US 6,798,955 B2
(45) Date of Patent: *Sep. 28, 2004

(54) ALIGNMENT APERTURES IN AN OPTICALLY TRANSPARENT SUBSTRATE

(75) Inventors: Ron Kunkel, Jim Falls, WI (US); Gary O'Connor, Bolingbrook, IL (US)

(73) Assignee: Corona Optical Systems, Inc., Lombard, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/352,477

(22) Filed: Jan. 28, 2003

(65) Prior Publication Data

US 2003/0219209 A1 Nov. 27, 2003

Related U.S. Application Data

(62) Division of application No. 10/136,726, filed on May 1, 2002, now Pat. No. 6,526,206.
(60) Provisional application No. 60/287,762, filed on May 1, 2001, and provisional application No. 60/289,355, filed on May 8, 2001.

(51) Int. Cl.[7] ................................................. G02B 6/36
(52) U.S. Cl. .......................................... 385/52; 33/645
(58) Field of Search ........................ 33/645, 533, 613, 33/702, 704; 385/52, 15, 24, 25, 39, 43, 88; 356/153, 399, 400, 401; 382/287

(56) References Cited

U.S. PATENT DOCUMENTS

| | | | | |
|---|---|---|---|---|
| 5,325,451 A | * | 6/1994 | Hartman et al. | 385/49 |
| 5,420,954 A | * | 5/1995 | Swirhun et al. | 385/92 |
| 5,596,662 A | * | 1/1997 | Boscher | 385/55 |
| 6,023,336 A | * | 2/2000 | Hill | 356/399 |
| 6,118,917 A | * | 9/2000 | Lee et al. | 385/49 |
| 6,318,909 B1 | * | 11/2001 | Giboney et al. | 385/90 |
| 6,450,704 B1 | * | 9/2002 | O'Connor et al. | 385/92 |
| 6,526,206 B2 | * | 2/2003 | Kunkel et al. | 385/52 |
| 6,600,853 B2 | * | 7/2003 | Wickman et al. | 385/24 |
| 6,633,707 B1 | * | 10/2003 | Murali | 385/52 |

* cited by examiner

*Primary Examiner*—Christopher W. Fulton
(74) *Attorney, Agent, or Firm*—Welsh & Katz, Ltd.

(57) ABSTRACT

A method and apparatus are provided for aligning a set of connector guide pins to an optical array, The method comprises the steps of disposing the optical array on a transparent substrate such that an axis of transmission of the optical array passes directly through the transparent substrate, disposing a heatsink with a set of alignment guide pins on a rear surface of the optical array with the set of alignment guide pins extending through the transparent substrate on either side of the optical array, and slotting a set of holes where the set of alignment guide pins extends through the transparent substrate to allow for thermal expansion.

23 Claims, 3 Drawing Sheets

ALIGNMENT APERTURES IN AN OPTICALLY TRANSPARENT SUBSTRATE

CROSS REFERENCE TO RELATED APPLICATIONS

This application is a divisional of U.S. application Ser. No. 10/136,726 filed on May 1, 2002 (now U.S. Pat. No. 6,526,206) which is a continuation in part of U.S. Provisional Application Nos. 60/287,762, and 60/289,355, filed May 1, 2001 and May 8, 2001, respectively.

FIELD OF THE INVENTION

The field of the invention relates to optoelectric data transmission systems, and alignment and interconnection of optical components.

BACKGROUND OF THE INVENTION

In coupling optical waveguides or optical components together, precision alignment is important. When two optical components are placed together with the objective of accurately transferring optical signals, the connection between the two interfaces must be within a tight tolerance to achieve high coupling efficiency. A guiding mechanism is typically used to achieve the required tolerances in connecting two mating optical components. This results in improved optical coupling efficiency.

Solder is often used to mechanically and electrically connect parts. During a solder reflow process though, interlinked components may expand at different rates if made of differing materials. This differential expansion can induce unwanted stresses on components, further leading to cracking, misalignment, or detaching of components. These unwanted results could be exacerbated if alignment tolerances between interlinked components are already near their tolerance limit. Mechanical stresses may also need to be controlled within the storage and operating temperatures of the device, and not just during solder reflow procedures.

As stresses are induced on optical components, it is important to ensure that optical alignment in maintained. In addition, optical alignment should be maintained after solder reflow when optical connectors are attached to the assembly and the optical device is functioning. Low placement tolerances are often needed between components to achieve the necessary optical alignment. However, these alignment tolerances can be difficult to achieve between optical components. In addition, lower placement tolerances can increase manufacturing costs.

The invention, described herein, provides an integral solution to the problem of differing expansion rates and low placement tolerance requirements in optical components. The invention serves to relieve induced stresses on components while maintaining component alignment. In turn, by relieving induced stresses on optical components, this can further broaden material selection to extend to those materials that are cheaper in price but traditionally have undesirable mechanical/optical properties.

DESCRIPTION OF THE DRAWINGS AND PREFERRED EMBODIMENT

Figure 1:
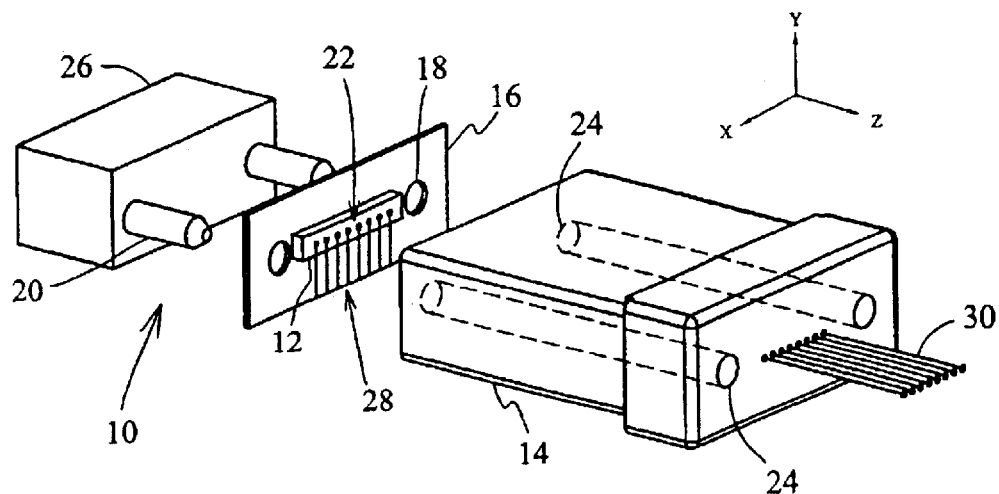
FIG. 1 is an exploded view of an optical subassembly and optical connector under an illustrated embodiment of the invention.

FIG. 1 shows an optical subassembly 10 and optical connector 14 in a context of use and generally in accordance with an illustrated embodiment of the invention. Included within the subassembly 10 may be an optical array 12 and an optically transparent substrate 16 to which the optical array 12 is attached. The optical array 12 may be mechanically attached to the substrate 16 by any conventional method such as stud bumps, adhesive, or solder bumps (not shown).

Figure 2:
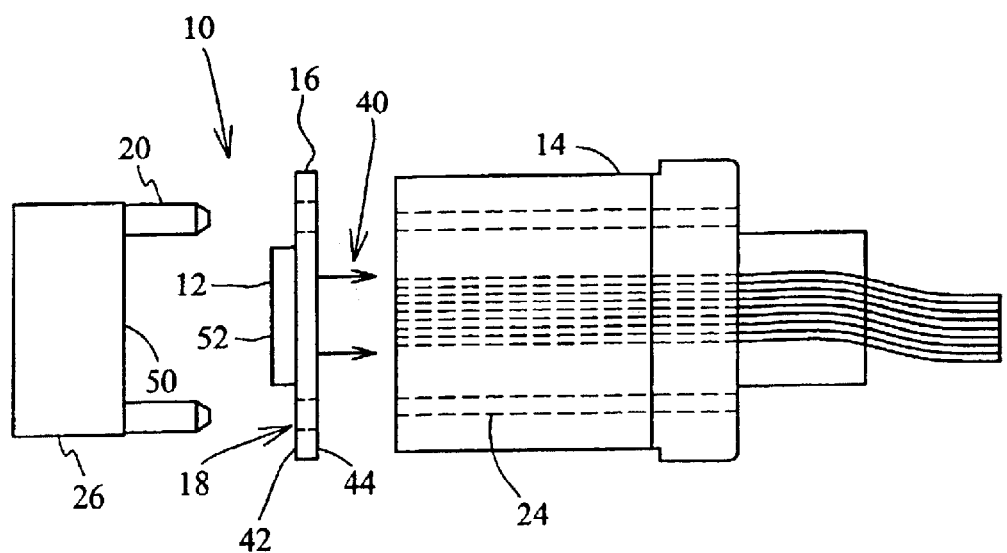
FIG. 2 is a top view of the optical subassembly and optical connector as shown in FIG. 1.

FIG. 2 illustrates a top view of the optical subassembly 10 and optical connector 14 as first shown in FIG. 1. As shown, the optical array 12 is attached to a first surface 42 of the substrate 16, such that optical signals 40 from the array 12 may pass directly through the transparent substrate. It will be understood that the optical array 12 can be any suitable photonic device or array of photonic devices including photo-transmitters, photo-receivers, or a combination thereof A photo-transmitter can be any suitable device such as a vertical cavity surface emitting laser (VCSEL), light emitting diode (LED), or the like. Furthermore, any suitable photo-receiving device can be used, such as a photodiode, i.e., P-I-N diode, PN diode, or the like. Thus, the optical array 12 can be a broad range of photoactive devices with transmitting and receiving capabilities.

The optical array 12 may have a number of optical ports 22 (shown in greater detail in FIG. 4) for coupling optical signals 40 to/from a respective photoactive device (not shown). The optical ports 22 define the optically active surfaces of the optical array 12. The optical ports 22 provide a source or destination of optical transmission paths 40 to photonics transmitters, receivers, or a combination of transmitters and receivers within the optical array 12. (The figures show the optical array 12 having eight optical ports 22, but the array 12 may contain any number of optical ports 22).

The optically transparent substrate 16 shown in FIGS. 1 and 2 may contain a plurality of electrical contacts and traces 28 for electrically connecting the optical array 12 to a signal processor (not shown). Electrical contacts may be defined on the substrate 16 by conventional photolithographic etching processing, or by any similar process. The substrate 16 may comprise a glass-like structure having desirable optical and structural properties. Materials that have been found to display adequate properties include glass, plastic, and sapphire. A form of plastic commonly used in optics is Kapton®. Although not optically transparent, Kapton® has been found acceptable for use when a window is cut in the substrate for optical signals to pass through. The present invention could use any of the preceding materials for a substrate, but one of the preferred materials is glass.

Glass also has a thermal expansion coefficient that is much closer to semiconductor devices (such as the optical array 12), as compared to the metal substrates more commonly used in photonics packaging. This reduces temperature-induced misalignment between packaged optical devices and externally coupled optical fibers 30. Alignment features 18 may also be placed in or on the substrate with micron or submicron accuracy, as described in more detail below. This greatly simplifies the alignment of the optical ports 22 of the array 12 with optical fiber connectors 14 that may also have complementary alignment structures 24 (described in further detail below).

The optically transparent substrate 16 and optical array 12 may then be attached to a guide pin holder 26, as shown in FIG. 2. Both the substrate 16 and array 12 may be attached to the guide pin holder 26 by an appropriate adhesive. The adhesive should allow for motion between the two components while still maintaining attachment and correct positioning. The guide pin holder 26 may comprise a rigid material having appropriate structural and thermal properties. Materials showing suitable properties include but are not limited steel and aluminum. Shown in the figures are guide pins 20 that may protrude from a first surface 50 of the guide pin holder 26. Furthermore, the guide pins 20 may comprise first and second guide pins, 32 and 34 respectively. The guide pins 20 could be made of a stainless steel or other material having suitable structural and wear properties.

In addition to functioning as a holder for the guide pins 20, the guide pin holder 26 may also function to remove heat from the optical array 12 and from additional IC's (not shown). Thus, the guide pin holder 26 should comprise a rigid material having an adequate thermal conductivity.

The guide pin holder 26 may also have a depression (not shown) on a front surface 50, such that the optical array 12 may fit into the space. Thus, the a back surface 52 of the optical array 12 and the first surface 42 of the substrate may respectively be coincident with the depression and first surface 50 of the pin holder 26.

Also shown on the optically transparent substrate 16 are alignment apertures 18 which may properly align the optical ports 22 of the optical array 12 to a plurality of optical fibers 30 of the optical connector 14. In an illustrated embodiment of the invention, the figures show two alignment apertures 18 on either side of the optical array 12. Yet, any number of apertures 18 may be used. In addition, the figures illustrate circular apertures 18, yet any shape or size of apertures may be used for in the invention.

In a preferred embodiment of the present invention, the apertures 18 may be disposed on opposing sides of the optical array 18, precisely positioned relative to the optical array 12. Specifically, the apertures may be disposed in the substrate at an appropriate distance from the optical ports 22 of the array 12.

Figure 3:
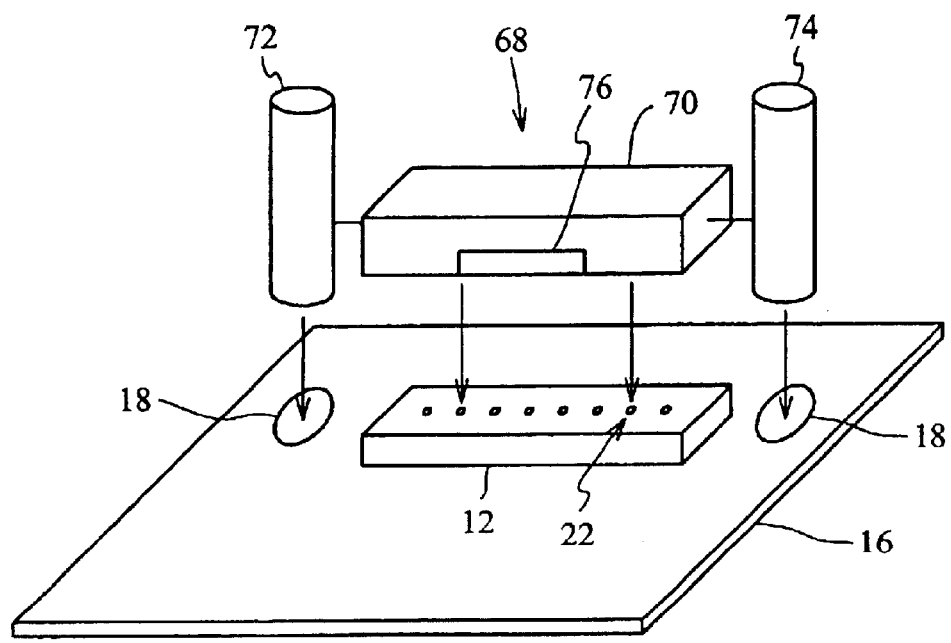
FIG. 3 is another exploded view of the elements shown in FIG. 1.

Alignment apertures 18 may be formed using conventional techniques such as laser ablation, chemical etching, plasma etching, or a similar process. In a preferred embodiment of the present invention as shown in FIG. 3, a laser ablation technique with a boring fixture 68 may be used. The boring fixture 68 may include a pattern recognition module 70 and lasers 72, 74. The pattern recognition module 70 may include software adapted to recognize and position itself over a line of targets.

Once recognition of the targets has occurred, the pattern recognition module 70 functions to identify a transverse line passing through the line of targets as well as a center point of the line of targets. The pattern recognition module 70 then positions its own transverse line and center point with the identified transverse line and center point. The lasers 72, 74 may be precisely aligned along the transverse line of the pattern recognition module 70. The lasers 72, 74 are also positioned a precise distance on either side of the center point of the pattern recognition module 70.

The pattern recognition module 70 may be programmed to view the array 12 through the transparent substrate 16 and identify a set of alignment targets. In a preferred embodiment of the invention, the optical ports 22 may be used as alignment targets for the pattern recognition module 70 to identify. Once the pattern recognition module 70 has aligned itself with the registration targets (and also the lasers 72, 74 on either side of the targets as shown), the boring fixture 68 activates the lasers 72, 74 to ablate the holes 18 in precise alignment with the ports 22.

Included within the boring fixture 68 may be a precision lateral drive mechanism 76. The precision lateral drive mechanism 76 may function to offset the position of one of the boring devices (e.g., 74) by a predetermined distance "a" along a center line of the ports 22 on either side of a nominal position. The nominal position may be regarded as defining the distance between the pins 20 at room temperature. The distance "a" may be regarded as defining the distance between the pins 20 at some predetermined tolerance range and operating temperature limit (e.g., 0° C., 100° C., etc.).

In use, the boring fixture 68 may assume a nominal position with respect to the array 12 and may be activated to bore a set of holes on opposing sides of the array 12. Following creation of the initial set of holes, the lateral drive 76 may be activated to drive the boring device 74 to a distance "a" on either side of the nominal position while the boring device 74 is still active. Activating the lateral drive 76 while the boring device 74 is active causes the slotting of the hole 56 shown in FIG. 4.

Figure 4:
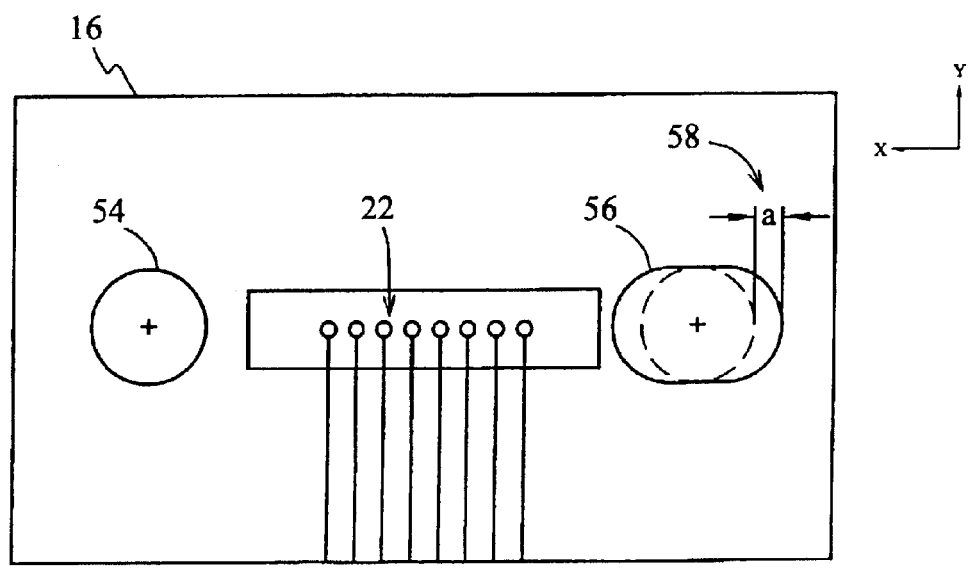
FIG. 4 is a front view of the substrate and optical array.

FIG. 4 illustrates an enlarged view of the substrate 16 and particularly the alignment apertures 18 after the laser ablation process is complete. Shown are a circular aperture 54 and an oval shaped aperture 56. Details of the apertures will be discussed in further detail.

When an optical subassembly enters solder reflow, components of the subassembly may begin shifting relative to one another because of differing expansion coefficients. If components are made of the same material, this relative shifting will not occur. For example, it is desirable to choose a substrate 16 and pin holder 26 that have comparable coefficients of thermal expansion. Yet, the constraints in material selection make it difficult to select a pin holder 26 and substrate 16 that substantially have the same expansion rate. Selecting a pin holder 26 material having a coefficient of thermal expansion substantially close to that of the substrate's 16 may not be cost efficient or suitable for high volume production. In the same manner, a substrate 16 having a coefficient of thermal expansion substantially close to that of the pin holder's 26 may not have a suitable optical and structural properties.

It has been found that the preferred pin holder material thermally expands at a greater rate than the substrate. For this reason, if the substrate 16 were adapted to allow the pin holder 26 to freely expand without inducing stresses on the substrate 16, the material selection requirements for each component can be expanded. For example, the substrate 16 illustrated in FIG. 4 is adapted to allow motion of the pin holder 26 with respect to the substrate 16, without inducing significant stresses on the substrate 16. It should be noted that stresses exerted on the substrate 16 due to expansion of the guide pins 20 under the illustrated embodiment of FIG. 4 is considered negligible.

Figure 5:
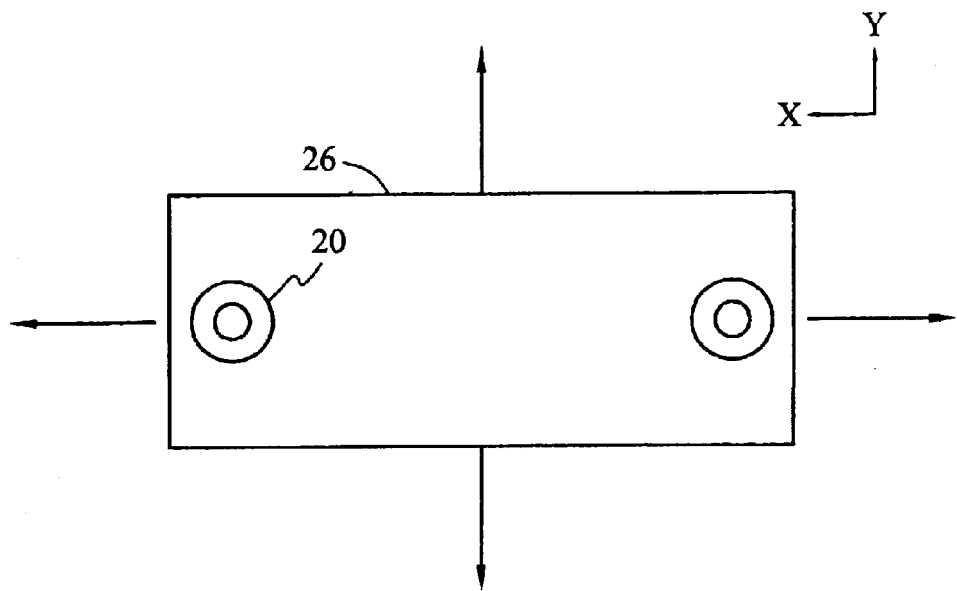
FIG. 5 illustrates the effects of thermal expansion on an optoelectronic component

As shown in FIG. 5, the pin holder 26 may expand in the 'x' and 'y' directions, horizontal and vertical respectively. (The substrate 16 is not shown in this figure, but is shown in the proceeding figures). As the pin holder 26 expands in the y direction, the guide pin 20 positions do not shift with respect to each other, (if the guide pins 20 were disposed in the substrate at differing y positions, then they would shift in that direction with respect to the other). As the pin holder 26 expands in the 'x' direction, the distance separating the guide pins 20 increases, which can in turn induce stresses on the substrate 16.

Turning back to FIG. 4, the circular aperture 54 may be slightly larger in diameter than the first guide pin 32. The first guide pin 34 may be inserted through the circular aperture 54 such that the apertures substantially restricts motion of the first guide pin 32 in the x and y directions. Yet, the circular aperture 54 may allow rotational movement of the first guide pin 32. The second guide pin 34 may be inserted through the eccentric aperture 56 such that the aperture 56 allows the guide pin 34 to freely move in the x direction and not in the y direction. The eccentric aperture 56 may then restrict rotational motion of the guide pin holder 26 about the z axis.

Shown in FIG. 4 within the eccentric aperture is a dashed circle. This dashed circle represents the nominal location of the second guide pin 34 when inserted in the substrate 16, (it should be noted that the circle represents the inserted guide pin in its ambient position and not when the guide pin position has changed from thermal expansion). In a preferred embodiment of the invention as shown, the eccentric aperture 56 is disposed in the substrate 16 such that the second guide pin 34 is positioned at the theoretical center of the aperture 56.

Thus, the distance separating the guide pins 20 can increase, due to thermal expansion of the guide pin holder 26, and forces are not directed from the guide pins 20 into the edges of the apertures 18 in the substrate 16. When the guide pins 20 exert forces on the edges of the substrate 16, cracks have been found to form in the substrate 16 when comprised of glass. In addition, stresses induced on a substrate made of a differing material could cause deformation or distortion of the substrate. Cracking in the substrate 16 can lead to structural instability of attached components and losses in optical integrity.

With the eccentric aperture 56, the second guide pin 34 can move a distance of 'a' in either direction of the pin's nominal position, as shown in FIG. 4. It should be noted that distance 'a' should at least be greater than the distance the second guide pin 34 travels when expansion occurs under a predetermined operating environment (e.g., 0–100° C.).

Figure 6:
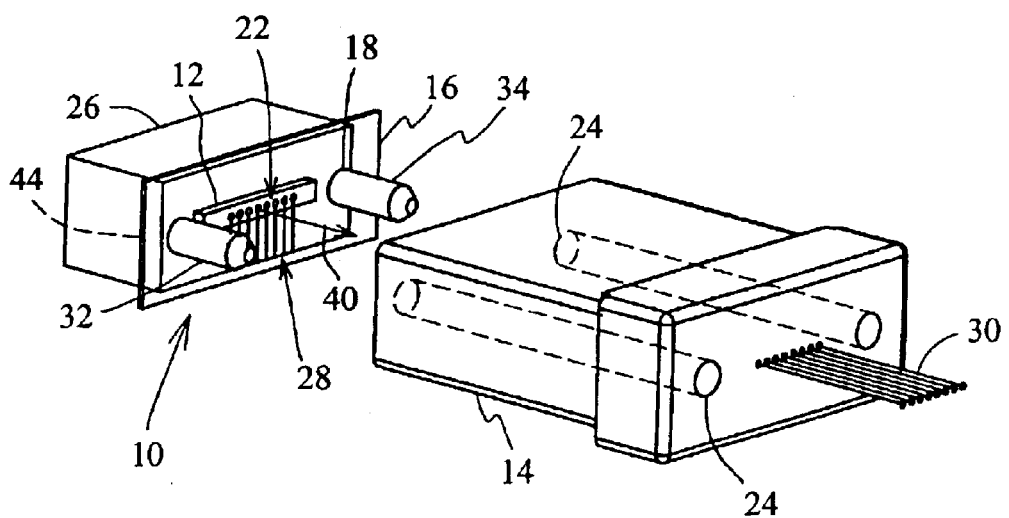
FIG. 6 is another exploded view of the optical subassembly and optical connector upon alignment of an optical array to optical fibers.

Upon operation of the optical subassembly 10, (after solder reflow), a first surface of the optical connector 14 may be placed coincident with the second surface of the substrate 44, such that the guide pins are inserted into corresponding apertures in the optical connector 14, as shown in FIG. 6. Optical alignment of optical ports 22 to the corresponding optical fibers 30 is maintained by the interaction of the respective apertures 24, 54, 56 of the substrate 16 and connector 14 with the common reference point provided by the pins 20. That is, the circular apertures 54 maintains the position of the pin holder 26 with respect to itself, while the pin 20 maintains the position of the optical connector 14 with respect to the array 14. The eccentric aperture 56 allows for thermal expansion and a higher tolerance variation between the guide pin 34 and aperture 56. In a preferred embodiment of the invention, the optical connector 14 could be a standard MT connector manufactured by US Conec or Nippon Telephone & Telegraph (US Conec Part number MTF-12MM7).

While a specific embodiment of the invention has been shown and described, it should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of aligning an optical array to an alignment guide comprising the steps of:

disposing the optical array on an optically transparent substrate;

optically recognizing a plurality of optical ports of the optical array through the optically transparent substrate; and aligning the alignment guide with the optically recognized optical ports.

2. The method of aligning the optical array to the alignment guide as in claim 1 wherein the step of optically recognizing the plurality of optical ports further comprises automatically recognizing the plurality of optical ports.

3. The method of aligning the optical array to the alignment guide as in claim 1 wherein the step of optically recognizing the plurality of optical ports further comprises identifying a transverse line passing through the plurality of optical ports.

4. The method of aligning the optical array to the alignment guide as in claim 3 wherein the step of identifying the transverse line passing through the plurality of optical ports further comprises locating a center point of the transverse line.

5. The method of aligning the optical array to the alignment guide as in claim 4 further comprising defining a registration target of the plurality of registration targets as surrounding an optical port of the optical array.

6. The method of aligning the optical array to the alignment guide as in claim 4 further comprising aligning a pattern recognition module of a boring fixture over the plurality of optical ports so that a transverse line and center point of the pattern recognition module coincide with the transverse line and center of the transverse line of the optical ports.

7. The method of aligning the optical array to the alignment guide as in claim 6 further comprising locating a laser along the transverse line of the pattern recognition module a predetermined distance from the center point of the transverse line of the pattern recognition module.

8. The method of aligning the optical array to the alignment guide as in claim 7 wherein the step of locating the laser further comprises ablating an aperture in the optically transparent substrate on the transverse line at the predetermined distance from the center of the transverse line of the plurality of optical ports.

9. The method of aligning the optical array to the alignment guide as in claim 8 wherein the step of ablating the aperture in the optically transparent substrate on the transverse line at the predetermined distance from the center of the transverse line of the plurality of optical ports further comprises ablating a second aperture along the transverse line of the registrations targets at the predetermined distance from the transverse line of the plurality of optical ports on an opposite side of the center point.

10. The method of aligning an optical array to an alignment guide as in claim 8 further comprising disposing the alignment guide in the ablated aperture.

11. An apparatus for aligning an optical array to an alignment guide comprising:
   the optical array disposed on an optically transparent substrate;
   means for optically recognizing a plurality of optical ports of the optical array through the optically transparent substrate; and
   means for aligning the alignment guide with the optically recognized optical ports.

12. The apparatus for aligning the optical array to the alignment guide as in claim 11 wherein the means for optically recognizing the plurality of optical ports further Comprises means for automatically recognizing the plurality of optical ports.

13. The apparatus for aligning the optical array to the alignment guide as in claim 11 wherein the means for optically recognizing the plurality of optical ports further comprises means for identifying a transverse line passing through the plurality of optical ports.

14. The apparatus for aligning the optical array to the alignment guide as in claim 13 wherein the means for identifying the transverse line passing through the plurality of optical ports further comprises means for locating a center point of the transverse line.

15. The apparatus for aligning the optical array to the alignment guide as in claim 14 further comprising defining a registration target of the plurality of registration targets as surrounding an optical part of the optical array.

16. The apparatus for aligning the optical array to the alignment guide as in claim 14 further comprising means for aligning the means for recognizing over the plurality of optical ports so that a transverse line and center point of the means for recognizing coincide with the transverse line and center of the transverse line of the optical ports.

17. The apparatus for aligning the optical array to the alignment guide as in claim 16 further comprising a laser located along the transverse line of the pattern recognition module a predetermined distance from the center point of the transverse line of the pattern recognition module for boring an aperture in the optically transparent substrate on the transverse line at the predetermined distance from the center of the transverse line of the plurality of optical ports.

18. The apparatus for aligning an optical array to an alignment guide as in claim 17 further comprising the alignment guide disposed in the bored aperture.

19. An apparatus for aligning an optical array to an alignment guide, such apparatus comprising:
   the optical array disposed on an optically transparent substrate;
   a plurality of optical ports that are optically recognizable through the optically transparent substrate; and
   a boring fixture adapted to recognize the plurality of optical ports through a continuous portion of the optically transparent substrate.

20. The apparatus for aligning the optical array to the alignment guide as in claim 19 wherein the boring fixture further comprises a pattern recognition module adapted to automatically recognize the plurality of optical ports and align the boring fixture over a transverse line and center point of the plurality of optical ports.

21. The apparatus for aligning the optical array to the alignment guide as in claim 20 wherein the boring fixture further comprising a laser located a predetermined distance from a center point of the pattern recognition module for boring an aperture in the optically transparent substrate on the transverse line at the predetermined distance from the center of the plurality of optical ports.

22. The apparatus for aligning an optical array to an alignment guide as in claim 21 further comprising the alignment guide disposed in the bored aperture.

23. The apparatus for aligning the optical array to the alignment guide as in claim 19 further comprising defining a registration target of the plurality of registration targets as surrounding an optical port of the optical array.

* * * * *